United States Patent [19]

Takahashi

[11] Patent Number: 4,633,356
[45] Date of Patent: Dec. 30, 1986

[54] MAGNETIC DISC CARTRIDGE WITH COUNTER DISPLAY SECURED AGAINST INADVERTENT DISPLACEMENT

[75] Inventor: Kenji Takahashi, Miyagi, Japan

[73] Assignee: Sony Corporation, Tokyo, Japan

[21] Appl. No.: 626,526

[22] Filed: Jun. 29, 1984

[30] Foreign Application Priority Data

Jun. 30, 1983 [JP] Japan .................................. 58-100256

[51] Int. Cl.[4] ...................... G11B 23/03; G11B 5/016; G11B 5/012
[52] U.S. Cl. ...................................... 360/133; 360/99; 235/103; 116/309
[58] Field of Search ................... 360/133, 137, 97, 98, 360/99, 96.5, 105; 116/309, 289; 235/103; 354/121; 206/387, 312, 309

[56] References Cited

U.S. PATENT DOCUMENTS 4,202,614  5/1980  Harvey .................................. 354/121
4,536,813  8/1985  Saito ........................................ 360/99

FOREIGN PATENT DOCUMENTS 58-57685  4/1983  Japan .................................... 360/133

Primary Examiner—John H. Wolff
Assistant Examiner—Alfonso Garcia
Attorney, Agent, or Firm—Lewis H. Eslinger; Alvin Sinderbrand

[57] ABSTRACT

A disc cartridge having a magnetic sheet jacket, a magnetic disc rotatably accommodated therein, and a window permitting the insertion of a magnetic head, is provided with a counter display member which is rotatably mounted in said jacket and surrounded, on the upper side of the jacket, by a graduated display scale and which has a keyhole-like aperture forming a radially oriented pointer and adapted to receive a drive pin. The counter display member is associated with an elastically acting click and pawl arrangement and has a first series of teeth formed on a flange-like portion of said counter display member and a click fixed to said jacket and elastically engaging the teeth of said first series of teeth and is also associated with a blocking device which keeps the counter display member in a firmly locked position as soon as it is mechanically disconnected from the drive pin.

8 Claims, 18 Drawing Figures

MAGNETIC DISC CARTRIDGE WITH COUNTER DISPLAY SECURED AGAINST INADVERTENT DISPLACEMENT

BACKGROUND OF THE INVENTION

1. Field of the Invention

This invention relates to a magnetic disc cartridge comprising a jacket, a magnetic flexible disc or sheet rotatably accommodated in said jacket and used for recording and/or reproducing video signals obtained from an electronic still picture camera and, more particularly, relates to a magnetic disc cartridge whose jacket, is provided with display means for indicating the number of recorded circular tracks on the magnetic sheet and also provided with locking means for preventing said display means from an inadvertent modification of its precise indicating position.

2. Description of the Prior Art

An electronic still picture camera includes an image sensor unit which converts an incident light image of an object into electromagnetic image signals, and a recording unit for magnetically recording said image signals on a disc shaped flexible magnetic sheet. In a camera of this type, the magnetic disc or sheet is rotated at a constant angular speed around its rotation axis and a magnetic head supplied with image signals for one picture or field, is held in frictional and magnetic contact with the magnetic sheet, whereby the image information signals for one field are magnetically recorded on one circular track or two circular tracks. After the completion of an image recording the magnetic head is fed or moved in a radial direction of the magnetic disc to the next unrecorded track. In this way, the image signals corresponding to a plurality of pictures are successively magnetically recorded along concentric tracks of the magnetic sheet.

The applicant has already proposed a magnetic disc cartridge, in which a disc-shaped magnetic sheet is rotatably accommodated in a jacket for handling and storage of the magnetic sheet. This type of magnetic cartridge is described in U.S. patent application Ser. No. 383,206 and U.S. Pat. No. 4,511,944 and is schematically represented by FIGS. 1 and 2 of the annexed drawings. In this case, the magnetic sheet 1 is rotatably accommodated in a magnetic sheet jacket 5 having an upper and a lower jacket part or half 3 and 4, said sheet or disc 1 being mounted on a center core or hub 2 which can be connected to not shown driving means.

The jacket 5 has a window 6, which faces a radial zone of the disc and through which a magnetic head 7 of the electronic still picture camera is inserted, and an opening 8, through which a motor drive shaft of the camera is inserted and connected to the center hub 2 of the disc 1. The jacket 5 is also provided with a rotatably counter display member 10 mounted outside the disc circumference in a corner area of the cartridge. The counter display member 10 has a keyhole-shaped aperture whose radial projection forms a pointer 13, pointing at a graduation of a display scale 14, provided on the upper side of jacket 5 around the counter display member 10.

The counter display member 10 is associated with a claw-clutch mechanism provided in the electronic still picture camera and able to enter the keyhole shaped aperture and to rotate the counter display member 10 intermittently step by step along a circular arc of predetermined length and angle, said display member 10 being linked to the magnetic head 7 so that its angular position corresponds to a determined position of the magnetic head which moves radially during an image sensing or recording cycle. The pointer 13 of the counter display member 10 indicates a numbered point on the display scale 14, by which the user may know the number of corresponding recorded tracks.

As the user may therefore know the number of recorded tracks, he may avoid overlapped recordings i.e. recordings of a plurality of different series of image signals on a single recording track, or skipping of non-recorded tracks.

However, when the known counter display member 10 is unintentionally or inadvertently rotated, the user can no longer know the accurate number of recorded tracks and the magnetic head 7 will no longer be correctly positioned with regard to its track, so that overlapped recordings or other undesired results will occur.

Furthermore, it may happen that the user removes the cartridge or jacket 5 from the camera body after having, for instance, taken 20 frames of images or pictures on a magnetic disc or sheet 1 having a capacity of 50 frames or pictures, and subsequently reinserts the jacket for recording images on the remaining unrecorded parts or tracks of the magnetic sheet 1.

In this case, the reinsertion of the jacket 5 into the camera body causes the claw-clutch mechanism on the side of the camera body to detect the position of the pointer 13, and to enter the keyhole-shaped aperture of the counter display member while moving the magnetic head 7 to a predetermined tracking position corresponding to the detected pointer position. In this way, the 21st picture frame of image is magnetically recorded on the 21st track. Even in this case, similarly to the above mentioned drawback, overlapped recordings or other undesired results may occur unless inadvertent or involuntary rotation of the counter display member 10 is prevented.

In the known magnetic sheet jacket 5, one tries to avoid this kind of involuntary rotation of the counter display member 10 with the help of a click and pawl arrangement in which a series of teeth 11 is formed on the periphery of the display member 10 and a click member 12 is elastically meshed in one of the spaces between said teeth. This locking arrangement does not however prevent with certainty involuntary rotation of the counter display member 10.

OBJECTS OF THE INVENTION

An object of this invention is to avoid inadvertent or involuntary rotation of the counter display member of a magnetic sheet jacket and consequently an inaccurate positioning of the magnetic head.

Another object of this invention is to provide, in a magnetic disc cartridge, means for keeping the counter display member in a predetermined fixed position between two successive recording and/or reproducing cycles.

Yet another object of this invention is to provide, in a magnetic disc cartridge or jacket, locking means for the counter display member which is rendered active as soon as the cartridge is removed from a recording or reproducing apparatus and which can be rendered inactive as soon as said cartridge is inserted in such an apparatus.

SUMMARY OF THE INVENTION

The foregoing and other objects of the invention are achieved by providing a disc cartridge comprising a magnetic sheet jacket; a magnetic flexible disc or sheet rotatably accommodated in said jacket; a window cut in said jacket and permitting the insertion of a magnetic head; a counter display member rotatably mounted in said jacket and being coaxially surrounded on the upper side of the jacket, by a graduated display scale which cooperates with a keyhole-like aperture in the counter display number forming a radially oriented pointer; an elastically and permanently acting click and pawl arrangement having a first series of teeth formed on a flange-like portion of said counter display member and a click fixed to said jacket and elastically engaging the teeth of said first series of teeth; and also comprises a blocking device which keeps the counter display member in a firmly locked position as soon as the cartridge is mechanically disconnected from the apparatus having said magnetic head. The mechanical disconnection of the counter display member occurs automatically as soon as the cartridge is removed from the recording or reproducing apparatus. The jacket body comprises upper and lower parts or shells coupled together by means of butt-welding. The magnetic sheet or disc is rotatably accommodated in the jacket around an axis which is perpendicular to its plane and to the upper and lower sides of said jacket and the counter display member is rotatably disposed inside the jacket so that its axis is parallel to the rotation axis of said disc. The counter display member desirably has a cylindrical shape and is provided with a flange-like portion formed on the axially intermediate portion of its cylindrical body. A first series of teeth and a second series of teeth are arranged in peripheral area of the flange-like portion. The teeth of each series of teeth have a saw-tooth shape and a pitch corresponding to a unitary rotational step or swing angle of the counter display member, said counter display member serving to display the number of recorded tracks on the magnetic sheet or disc by having its pointer directed towards one point of the graduated display scale provided around said counter display member on the upper side of the jacket. The first series of teeth is arranged on one of the two sides of the flange-like portion perpendicular to the rotation axis of the counter display member and an elastically suspended click member which is fixedly disposed in the jacket, engages elastically with said first series of teeth. The second series of teeth is arranged on the cylindrical or peripheral face of the flange-like portion so that the teeth of said second series extend perpendicularly to the ones of said first series. A locking member is disposed inside the jacket so as to be able to move radially either into or out of engagement with the corresponding second series of teeth of the flange-like portion of the counter display member, said locking member having a locking pawl for radial engagement with the second series of teeth. On its rear side, the locking member is provided with a wedge portion. A spring loaded blocking member is slidably disposed in the jacket and has a frontal wedge which bears against the wedge portion of the locking member and urges the latter radially towards the counter display member, the blocking member being movable in a direction perpendicular to the direction of movement of the locking pawl. The locking member has a plane side which is located adjacent to the wedge portion of said locking member, said plane side extending perpendicularly to the radial moving direction of said locking member and parallel to the moving direction of the blocking member. Adjacent to its frontal wedge, the blocking member has a plane side portion which extends parallely to its moving direction and perpendicularly to the moving direction of the locking member. When both plane sides of the blocking and locking members bear against each other, the counter display member is firmly blocked in its position and can only be liberated by the withdrawal of the blocking member.

The blocking member has a control means which cooperates with a command part of the recording or reproducing apparatus so as to withdraw the spring loaded blocking member from its blocking position, the cartridge or jacket being provided with an opening through which said command part engages with said control means when the cartridge is inserted in said apparatus, for instance, an electronic still picture camera.

With the structure according to the present invention, the counter display member is completely blocked against rotation by the engagement of the locking pawl with the second series of teeth when the magnetic sheet jacket is removed from the camera body or the like. In addition, even when the counter display member is rendered able to rotate by the disengagement of the locking pawl, from the second series of teeth, disengagement caused by the insertion of the magnetic disc cartridge into the camera or the like, it is not perfectly free to rotate as it is still held in its predetermined position by the elastically mounted click member meshing with its corresponding first series of teeth. The counter display member will only rotate by a predetermined angle when the driving force exerted on it from the camera drive or the like, overcomes the resilient locking force due to the meshing action of the first series of teeth and the click member.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
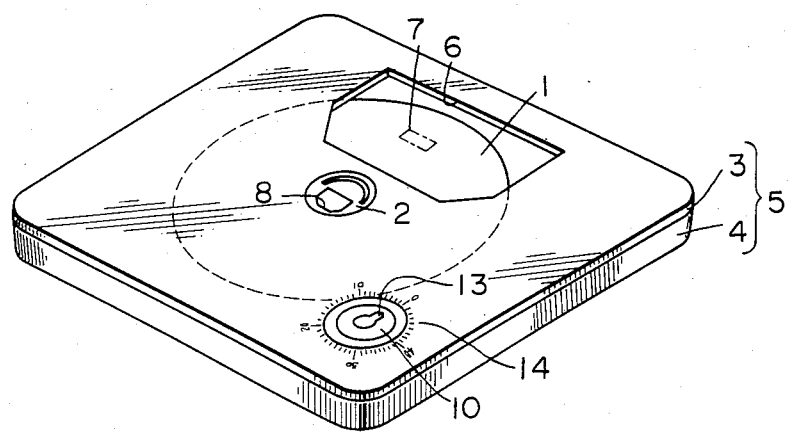
FIG. 1 is a perspective view, on an enlarged scale, showing a prior art magnetic disc cartridge.
Figure 2:
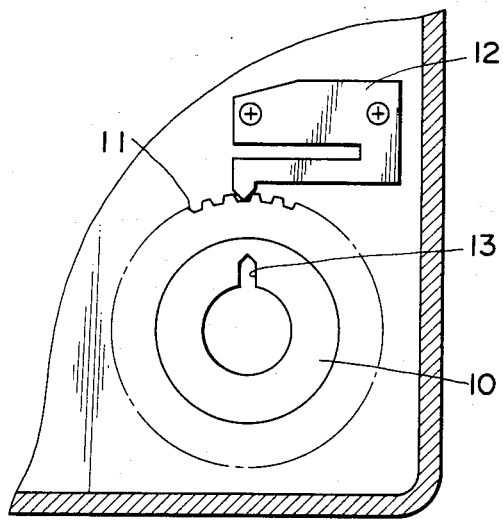
FIG. 2 is a fragmentary exploded plan view showing a lower jacket half of the prior art magnetic disc cartridge of FIG. 1.

The preferred embodiments of the present invention will now be described with reference to FIGS. 3 to 15. In the drawings, the same reference numerals are used throughout for designating identical elements, members, means and devices.

Figure 3:
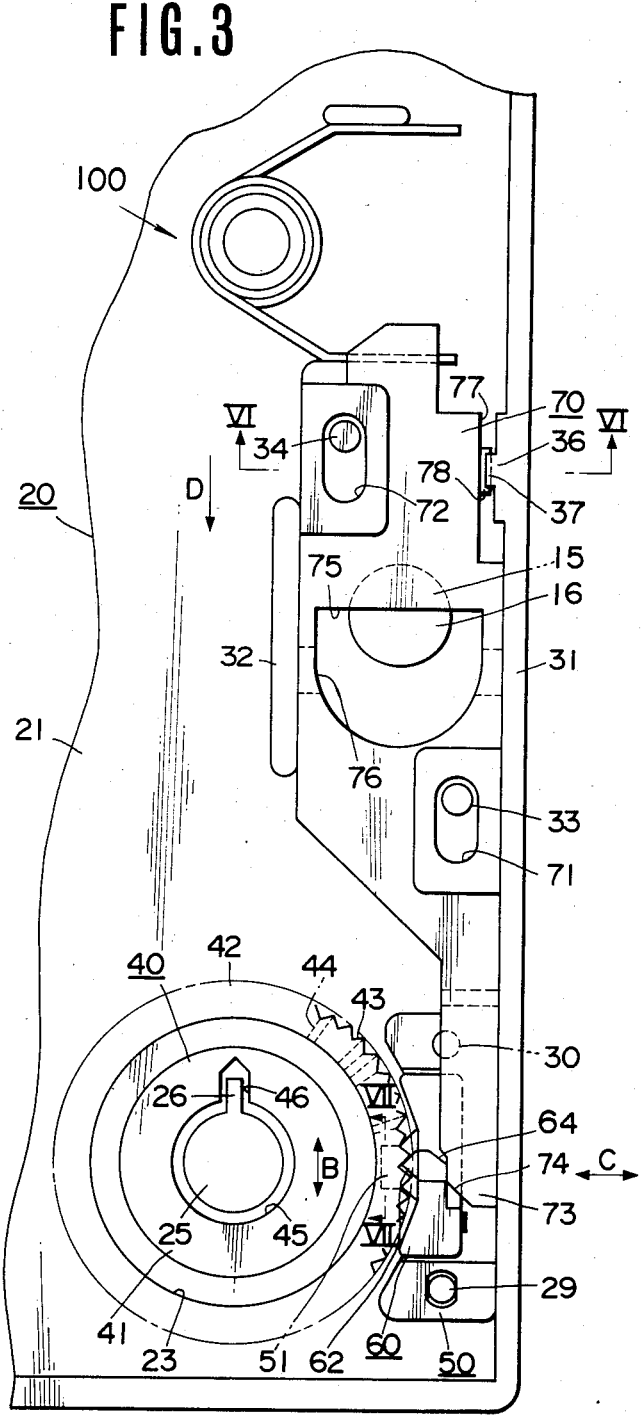
FIG. 3 is a fragmentary plan view showing on an enlarged-scale a part of a magnetic disc cartridge according to the present invention.

As shown in FIG. 3, a disc cartridge 20 comprises a lower part or shell 21 in which are accommodated at predetermined positions a counter display member 40, a locking member 60, a click member 50 and a blocking member 70 or the like.

Figure 4A:
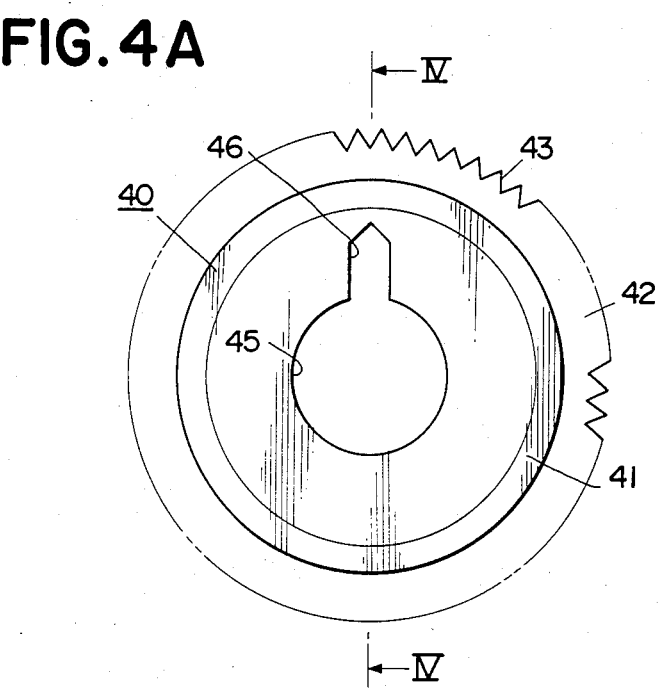
FIG. 4A to FIG. 4C illustrate a counter display member lodged in the jacket of the cartridge of FIG. 3 with FIG. 4A being a plan view, FIG. 4B being a sectional view taken along line IV—IV in FIG. 4A and FIG. 4C being a bottom view of said counter display member.
Figure 4B:
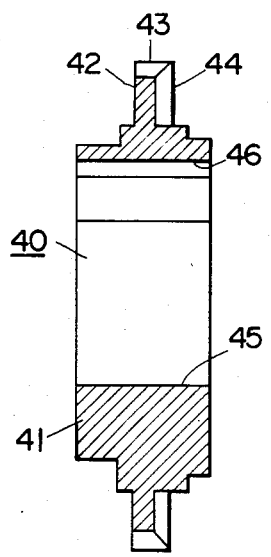
Figure 4C:
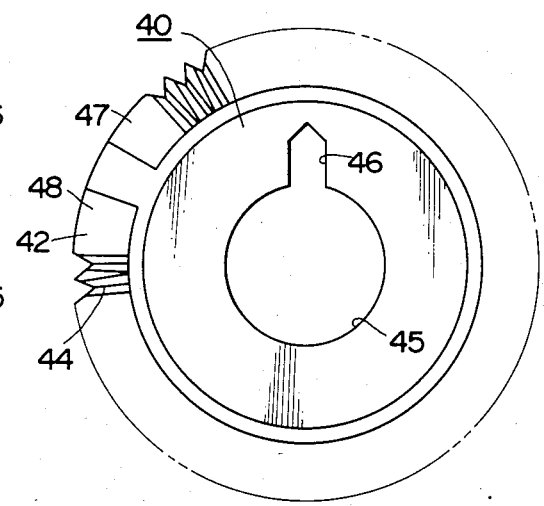

The counter display member 40, as shown in FIG. 4, has a cylindrical body 41 having an axial length substantially equal to the thickness of the magnetic disc or sheet cartridge or jacket 20. This counter display member 40 mounted in the magnetic disc jacket 20 with opposite ends of its cylindrical body 41 being fitted in concentric openings 23 and 24 of different diameters and formed respectively in the parallel walls of the upper and lower shells or parts 21 and 22 of jacket 20. A flange-like portion 42 is formed as one piece on an intermediate portion or the cylindrical body 41 of the counter display member 40. The flange-like portion 42 has two parallel sides perpendicular to the rotation axis of the counter display member 40; one of these sides, preferably the one facing the bottom wall of the lower jacket shell or part 21, is provided along an annular area with a first series of teeth 44, which teeth are oriented in radial directions with respect to the rotation axis of the counter display member 40, and are elastically engaged by click member 50. On the peripheral face of the flange-like portion 42 is formed a second series of teeth 43, which teeth extend in coaxial directions with respect to the rotation axis of member 40 and perpendicularly to the radial extensions of the teeth of the first series 44. An inadvertent rotation of the counter display member 40 is restricted by the engagement of the first and second series of teeth 44 and 43 respectively with click member 50 and locking member 60.

The teeth of the first and second series of teeth 44 and 43 are made with a pitch corresponding to a unitary rotational step or swing angle of the counter display member 40. The plane top faces or straight top lines of corresponding teeth of the first and second series 44 and 43 are placed in the same radial planes with respect to the rotation axis of member 40 and cut each other.

The cyclindrical body 41 of the counter display member 40 has a central bore or aperture 45, which has a radially extending pointer notch 46 for indicating a point of the scale which is formed on the upper jacket side around the counter display member 40.

When the magnetic disc cartridge 20 is placed in the electronic still picture camera, a drive pin 25, which is rotated in step, i.e. in synchronized manner, with the radial movement of the magnetic head 7 above the magnetic disc, is inserted into the central bore 45, said drive pin being a part of the camera body. At the same time, a positioning and driving catch or claw 26 projecting radially from the drive pin 25 is received in the pointer notch 46. Thus, the drive pin 25 and counter display member 40 are linked together and can rotate in unison.

The magnetic head 7 is moved by the claw-clutch mechanism mentioned above to a predetermined tracking position corresponding to the position of the pointer notch 46.

Figure 5:
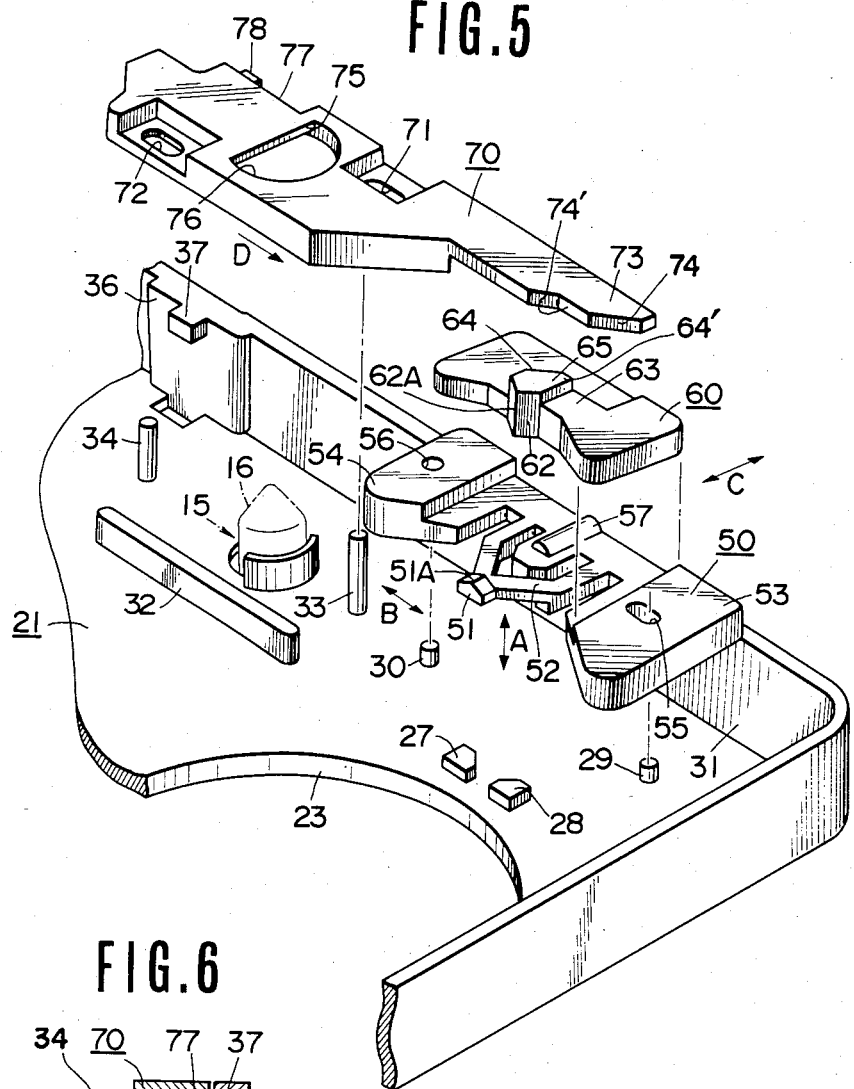
FIG. 5 shows at an enlarged-scale, a fragmentary and exploded perspective view of the disc cartridge.

The flange-like portion 42 has two raised portions or stoppers 47 and 48, which are formed at predetermined positions on the same side as the first series of teeth 44 and define the swivelling or rotation range of the counter display member 40. The raised portions or stoppers 47 and 48 for defining the swivelling or rotation range of the counter display member 40 may abut selectively against one of the corresponding stoppers 27 and 28 projecting from the bottom of the lower jacket shell or part 21 placed at predetermined positions thereof, as shown in FIG. 5. The swivelling or rotation range extends between a position, at which the pointer notch 46 corresponds to a graduation point "0" of the display scale 14 provided on the side of the upper jacket shell or part 22, and a position, at which the pointer notch is directed towards the last graduation point.

An annular pad member 49, for instance made of felt, is bonded to the upper side of the flange-like portion 42 in front of the lower side of the top wall of upper shell 22.

At its central portion, the click member 50 has a click pawl 51 which projects radially towards the rotation axis of member 40 and elastically engages with teeth of the first series 44 as shown in FIG. 5. The click pawl 51 is linked with a main body of the click member 50 by converging elastic arm portions 52, so that it is elastically movable in both directions which are approximately parallel to the rotation axis of member 40, i.e. in the directions of arrows A in FIGS. 5, 7 and 10.

On its end, the main body of the click member 50 has raised support portions 53 and 54 positioned on both sides of the click pawl 51 and its arms 52. Each of these raised support portions 53 and 54 has a positioning hole 55 and 56 provided in a predetermined area. When the click member 50 is properly set on the bottom of the lower jacket shell 21, two centering bolts 29 and 30 projecting upwards from the lower jacket shell 21 at predetermined positions are inserted into the corresponding positioning holes 55 and 56. The click member 50 is thus positioned by these centering bolts or pins 29 and 30 and by a neighbouring upright side wall 31 of the lower jacket shell 21. One (55) of the two positioning holes 55 and 56 has an elongated form as shown in FIG. 5 in order to compensate inaccuracies of manufacture.

Figure 7:
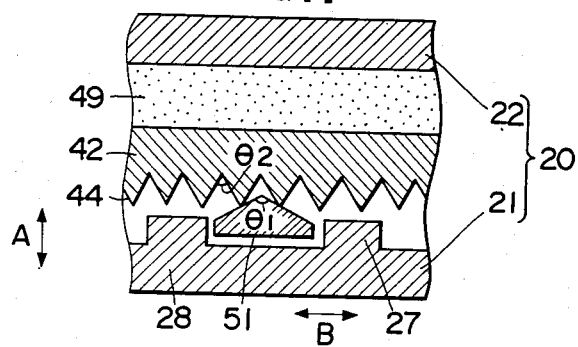
FIG. 7 is a sectional view taken along line VII—VII in FIG. 3.

When the click member 50 is positioned in the described manner, its click pawl 51 elastically engages with the first series of teeth 44 provided on the underside of the flange-like portion 42 of member 40, as shown in FIG. 7, thereby urging the pad member 49 of the counter display member 40 upwards against the top wall of the upper shell 22. By these means is created a double locking effect which is caused firstly by the click and pawl arrangement cooperating with the first series of teeth, and secondly by the frictional resistance appearing at the pad member 49.

Thus, inadvertent movement of the counter display member 40 is prevented by the engagement of the click pawl 51 with the first series of teeth 44. However, the counter display member 40 can be rotated intermittently in spite of the stopping action exerted on it by the elastically mounted click pawl 51.

As shown in FIG. 7, the click pawl 51 has a dihedral tip or tooth 51A whose angle $\theta_1$ is bigger than the intertooth profile angle $\theta_2$ of the first series of teeth 44. This arrangement ensures the engagement between the click pawl 51 and a pair of teeth, of first series 44, even if the engagement position between said click pawl 51 and the corresponding teeth of said first series 44 is slightly departed in the radial or rotational direction of the flange-like portion 42.

The click pawl 51 is arranged between the two stoppers 27 and 28 as shown in FIG. 7. Thus, it can never be displaced in the direction of rotation of the counter display member 40, i.e. in the directions of arrows B shown in FIGS. 5, 7 and 8. When it is urged to follow the rotation of the counter display member 40, the click pawl yields downwards as it can move elastically only in the directions of arrows A shown in FIG. 7. The counter display member 40 can thus be intermittently rotated with accuracy at a distance corresponding to a predetermined angle (i.e. pitch angle), and there is no possibility for the arm portions 52 connecting the click pawl 51 to the main body of the click member 50 to be occasionally broken or damaged.

In the middle part of its upper side, the click member 50 has a guide protuberance 57, which is engaged in a guide groove 61 formed in the bottom of the locking member 60 at a predetermined position for guiding the sliding motion of the locking member 60 as shown in FIG. 5. More specifically, the locking member 60 is disposed between the raised support portions 53 and 54 of the click member 50 as shown in FIGS. 5 and 8, with the guide protuberance 57 of the click member 50 engaged in the guide groove 61 formed in the bottom of the locking member 60 as shown in FIG. 9.

Figure 8:
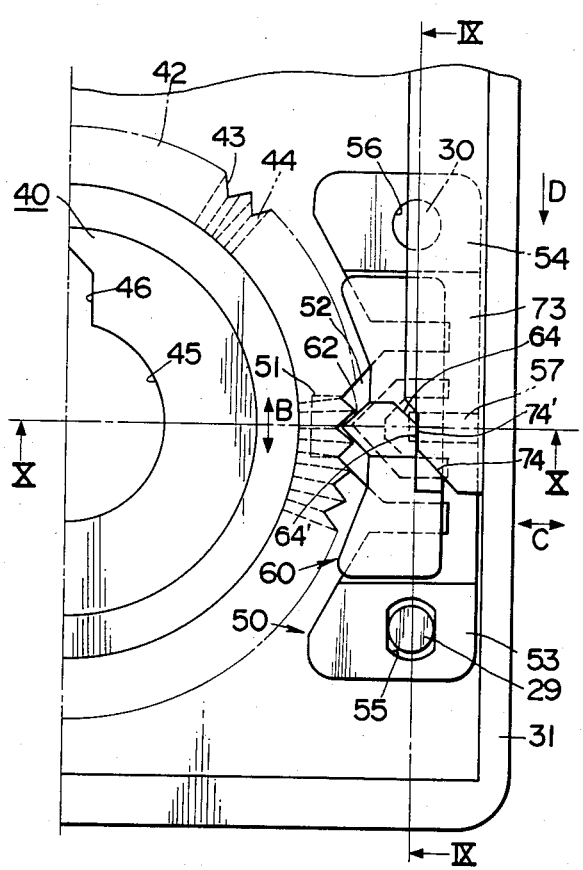
FIG. 8 shows on an enlarged-scale, a fragmentary plan view of the cartridge according to FIG. 3.
Figure 9:
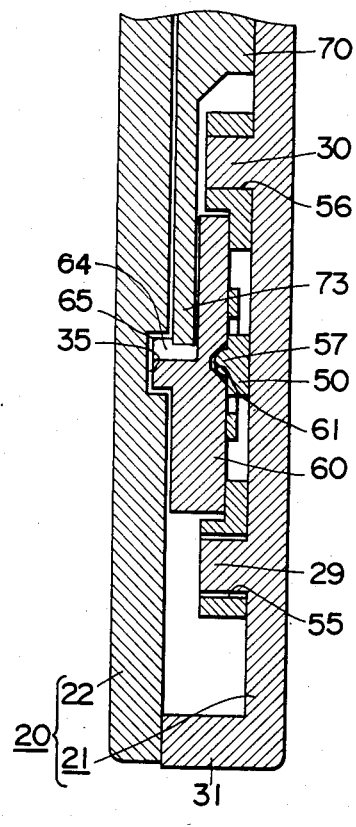
FIG. 9 is a sectional view taken along line IX—IX in FIG. 8.

The locking member 60 is thus guided by the guide groove 61 and the raised support portions 53 and 54 of the click member 50 so that it can move only in the directions of arrows C as shown in FIGS. 5 and 8, i.e. in directions which are perpendicular to the rotation axis of the counter display member 40 and parallel to the radial plane of the latter, which is also the plane of symmetry of the click member and especially of the click pawl 51 and the guide protuberance 57.

In front of the flange-like portion 42, the locking member 60 has a locking pawl 62 which is integrally formed, at the middle part thereof and which is adapted to be engaged in at least a pair of teeth of the second series of teeth 43 of the counter display member 40. The counter display member 40 can be perfectly locked against rotation by the engagement between the locking pawl 62 and the second series of teeth 43.

The locking pawl has a radially orientated tooth or tip 62A which lies in the same radial plane of the counter display member 40 as tip 51A of the click pawl 51. In this same radial plane, both click pawl 51 and locking pawl 62 mesh with teeth respectively of the first and second series of teeth 44 and 43 of the counter display member 40 at the same angular position.

Between the locking pawl 62 and the raised support portion 53 of the click member 50 the upper side of the locking member 60 has a raised portion 63 as shown in FIG. 5. The raised portion 63 has a vertical rear side which extends in a direction normal to the directions of movement of the locking member 60 (i.e. perpendicular to the directions of arrow C in FIG. 5), and cooperates with a frontal wedge 73 of the blocking member 70. The locking member 60 further has a chamfered face or wedge portion 64 formed on the open side of the raised portion 63 i.e. on the rear side of the locking pawl 62 as shown in FIGS. 3, 5 and 8.

The locking member 60 has further an upper projection 65 above the locking pawl 62 and next to the open side of the raised portion 63 which is engaged in a corresponding guide groove 35 formed in the top wall of the upper shell 22 at a predetermined position thereof, as shown in FIG. 9. This guide engagement and the guide engagement between the click member 50 and locking member 60 mentioned before, permit the locking member 60 to be guided with accuracy along the radial directions of arrows C as shown in FIG. 5.

The blocking member 70 is substantially a flat member as shown in FIG. 5. At its end remote from the frontal wedge 73, the blocking member 70 is usually spring biased by a torsion coil spring 100 as shown in FIG. 3, so as to be permanently urged towards the locking member 60 in the direction of arrow D as shown in FIGS. 3, 5 and 8. The blocking member is mounted in the lower jacket shell 21 such that it is movable only in the directions parallel to side wall 31 of the lower jacket shell 21 and to arrow D in FIGS. 3, 5 and 8 while being held and guided in sliding contact with said side wall 31 and on its opposite side by a guide bar 32 provided on the bottom of the lower jacket shell 21 at a predetermined position thereof.

On its rear end and next to the side wall 31, the blocking member 70 has a longitudinal notch 77 (see FIGS. 3 and 5) on which is formed a protuberance 78 projecting towards wall 31 from a middle bottom portion of said notch 77.

Figure 6:
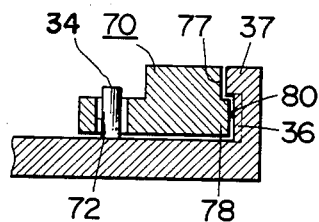
FIG. 6 is a sectional view taken along line VI—VI in FIG. 3.

A portion of the side wall 31 opposite to the notch 77 is provided with a ridge 36 which enters the notch 77. The side wall 31 also has a lateral protuberance 37 formed on the top of the ridge 36 as shown in FIG. 6. Thus, an undercut portion 80 is formed under the lateral protuberance 37, as shown in FIG. 6.

When the blocking member 70 is in the position shown in FIG. 3, urged by the torsion coil spring 100 in the direction of arrow D towards the locking member 60 (FIGS. 3 and 5), the lateral protuberance 37 of the side wall 31 overlaps said protuberance 78 of the blocking member 70 as shown in FIG. 6. In this manner, the operating member 70 is slidably guided and retained in the lower jacket shell 21 and prevented from inadvertent removal.

In addition, the length of the stroke of the blocking member 70 is defined in such a manner that the protuberance 37 covers protuberance 78 of the blocking member 70 when it occupies its blocking position as shown in FIG. 3 and that protuberance 78 is not covered by the lateral protuberance 37 when the blocking member 70 is in its rearward inactive position.

The blocking member 70 has longitudinally elongated insertion holes 71 and 72 formed at predetermined positions, and receiving centering pins 33 and 34 projecting from the bottom of the lower jacket shell 21 so that the longitudinal movement of the blocking member 70 is restricted to stroke of determined length.

The blocking member 70 further has a semicircular insertion aperture 76 which can receive a lock release pin 15 fixed in the camera body. The semicircular aperture 76 is closed by a straight edge 75. When the magnetic disc cartridge 20 is inserted in the electronic still picture camera, the lock release pin 15 projecting from the camera body and serving as means for pushing the blocking member 70 in its inactive or releasing position, is introduced into the insertion aperture 76. The lock release pin 15 has a tapered end face 16 as shown in FIGS. 3 and 5. When the lock release pin 15 is introduced in an insertion hole formed in the lower jacket shell 21 at a predetermined position thereof and from there into the insertion aperture 75, 76 of the blocking member 70, the tapered end face 16 of pin 15 passes into the aperture 76 by riding along the straight edge 75 thereof and pushing the blocking member 70 back in its inactive position. Thus, the insertion of the lock release pin 15 into the aperture 76 causes the blocking member 70 to move in the direction opposite to the direction of arrow D in FIG. 5 and against the action of spring 100.

The side or face of the straight edge 75 is inclined to permit smooth insertion of the lock release pin 15 as shown in FIG. 5.

The frontal wedge portion 73 of the blocking member 70 cooperates with the raised portion 63 of the locking member 60. When the cartridge 20 is removed from the camera body or the like, the frontal wedge 73 is pushed forwards in direction D, and forces thereby the raised portion 63 of the locking member 60 towards the counter display member 40 in the direction C (right arrow C), thus introducing the locking pawl 62 between the teeth of the second series of teeth 43 of the counter display member 40. In this position of the locking member 60, the locking pawl 62 prevents the counter display member 40 from any rotation. The engagement between the raised portion 63 of the locking member 60 and frontal wedge portion 73 is interrupted by the backward movement of the blocking member 70 in the direction opposite to the direction of arrow D in FIG. 5, this backward movement being caused by the insertion of cartridge 20 in the camera as mentioned above.

The frontal wedge 73 of the blocking member 70 has an oblique edge 74 extending backwards and towards the locking pawl 62 from the end of the frontal wedge portion 73 as shown in FIG. 5. The oblique edge 74 is inclined under a determined acute angle with respect to the locking and blocking directions C and D. Adjacent to the inner end of the oblique edge 74 the frontal wedge 73 shows a straight edge 74' extending backwards in a vertical plane parallel to the blocking direction D. On its rear end, the locking pawl 62 has a wedge portion comprisng an oblique edge 64 and an adjacent straight edge 64' the oblique edge 64 being parallel to the corresponding oblique edge 74 of the blocking member 70 and the straight edge 64' being parallel to the straight edge 74' of the frontal wedge 73, and being aligned with the inner rear side of the raised portion 63. When the blocking member 70 is allowed to move from its backward inactive position into its active position in the direction of arrow D, as shown in FIG. 5, the oblique edge 74 slides over the oblique edge 64 of the locking member 60 into engagement again with a pair of teeth of the second series of teeth 43. The locking member 60 is completely blocked in this position as the two straight edges 64' and 74' which extend also perpendicularly to the direction C abut each other and are held in this position by the action of spring 100.

FIGS. 12 to 15 show different examples of the means for preventing the detachment of the blocking member 70 from the lower jacket shell 21 as mentioned above.

Figure 12:
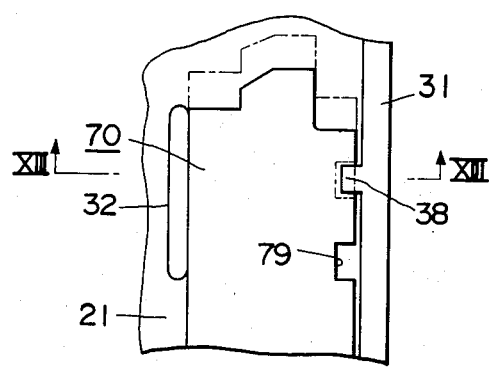
FIG. 12 is a plan view showing on an enlarged-scale a different embodiment of a blocking member which is a part of the present invention.

In the example shown in FIG. 12, the blocking member 70 has a notch 79 formed at its rear end in a longitudinal side neighbouring side wall 31 of lower jacket shell 21, while the latter is provided with an inwardly extending protuberance 38 which overlaps the blocking member 70 and may be bypassed by the notch 79. The blocking member 70 is put into the lower jacket shell 21 with the protuberance 38 received in the notch 79, and is then moved in the direction of arrow D in FIG. 12. As a result, one edge of the blocking member 70 is received in an undercut portion 81 defined by the protuberance 38, as shown in FIG. 13, so that an occasional detachment of the blocking member 70 is prevented.

Figure 13:
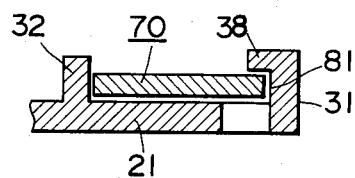
FIG. 13 is a sectional view taken along line XIII—XIII in FIG. 12.

The blocking member 70 has a thickness such that its lateral edge situated next to the side wall 31 can slide without notable clearance within the space 81 as shown in FIG. 13 and defined by the bottom of shell 21 and the upper protuberance 38.

Figure 14:
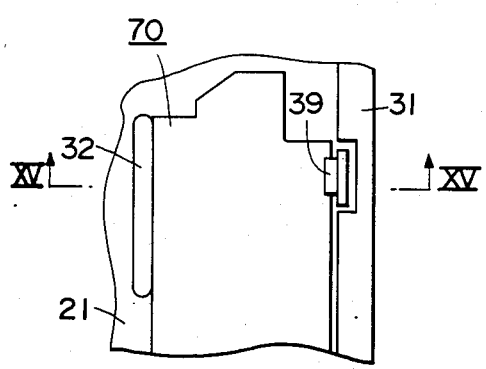
FIG. 14 is a plan view showing, on an enlarged-scale a further embodiment of the blocking member.
Figure 15:
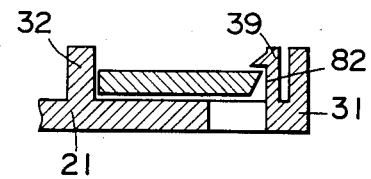
FIG. 15 is a sectional view taken along line XV—XV in FIG. 14.

In the example shown in FIG. 14, an elastically displaceable pawl 39 is provided on the top of an elastic vertical arm which forms a part of the side wall 31. One edge of the blocking member 70 is slidably mounted into an undercut portion 82 defined between the pawl 39 and the bottom of the lower jacket shell 21 as shown in FIG. 15. Occasional detachment of the blocking member 70 is prevented by the engagement between the pawl 39 and operating member 70 as shown in FIG. 15. The pawl 39 has an upper tapered face, and the blocking member 70 has a corresponding tapered edge inclined inwards and downwards, as shown in FIG. 15. The blocking member 70 can thus be put into the lower shell 21 by causing an outward flexing of the pawl 39.

Various functional parts described above, i.e. the click member 50, locking member 60, blocking member 70 and counter display member 40, are successively disposed in the lower jacket shell 21 in predetermined positions. Then, the blocking member 70 is positioned in the lower jacket shell 21 and retained by the protuberance 38 or pawl 39 as noted before, said blocking member 70 retaining also the locking member 60 and the click member 50 in their positions within the lower shell 21, so that none of these members can be inadvertently detached from the set position. After the achievment of the assembling of functional parts 40, 50, 60 and 70 and other functional parts not shown, the lower jacket shell 21 is covered by the upper jacket shell 22 and the edge of the upper jacket shell 22 is welded by supersonic welding to the edge of the side walls 31 of the lower jacket shell 21. At this time, the upper protuberance 65 of the locking member 60 is engaged in the guide groove 35 of the upper jacket shell 21, whereby the individual functional parts 40, 50, 60 and 70 are properly positioned with respect to the upper and lower jacket shells 21 and 22 of the cartridge 20.

In addition, even if the magnetic sheet cartridge 20 is vibrated during the process of supersonic welding, the blocking member 70 will not be detached as it is received in the undercut portion 80 of the side wall 31 and held down by protuberance 38 or pawl 39.

Figure 10:
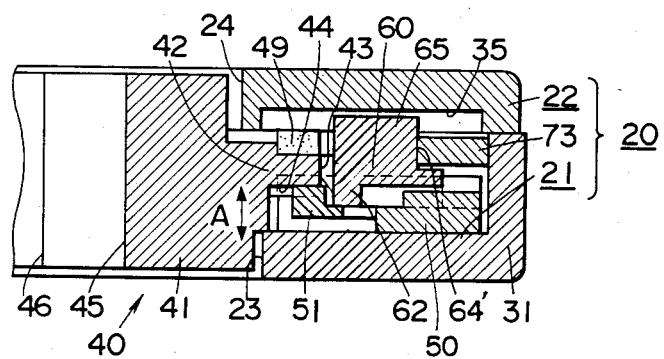
FIG. 10 is a sectional view taken along line X—X in FIG. 8.
Figure 11A:
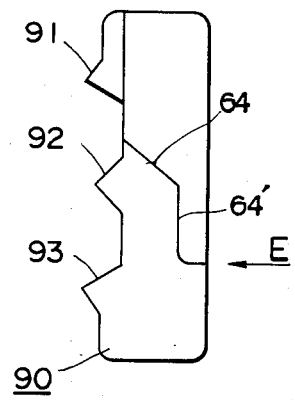
FIGS. 11A and 11B illustrate a different embodiment of a locking member, with FIG. 11A being an enlarged-scale plan view and FIG. 11B being a right side view of FIG. 11A as viewed in the direction of arrow E.
Figure 11B:
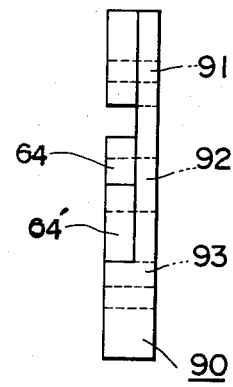

In the assembled state, the second series of teeth 43 of the counter display member 40 are engaged by the locking pawl 62 of the locking member 60 as shown in FIG. 10, while the first series of teeth 44 of the counter display member 40 are elastically engaged by the click pawl 51 of the click member 50 as shown in FIGS. 7 and 10.

Furthermore, the blocking member 70 is biased or loaded by the torsion coil spring 100 in the direction of arrow D in FIG. 8, so that the frontal wedge portion 73 of the blocking member 70 and the raised portion 63 of the locking member 60 are engaged with each other as shown in FIG. 8. Further, the outer edge of the blocking member 70 is guided by the side wall 31 of the lower jacket shell 21. The locking pawl 62 of the locking member 60 is thus reliably engaged in a pair of teeth of the second series of teeth 43 and perfectly locks the counter display member 40 against rotation.

When a magnetic disc cartridge 20 according to the above described structure is inserted in an electronic still picture camera, the lock release pin 15 penetrates into the insertion aperture 76 of the blocking member 70 as mentioned above. At this time, the tapered end face 16 of the pin 15 contacts the inclined edge 75 and moves or pushes the blocking member 70 backwards in its inactive position in the direction opposite to the direction of arrow D in FIG. 8. By this action, the frontal wedge portion 73 of the blocking member 70 is laterally withdrawn from the raised portion 63 of the locking member 60 which is thus released and may be moved outwardly in the radial direction of right arrow C and towards the side wall 31, as shown in FIG. 8.

When the counter display member 40 is rotated by the drive pin 25 of the claw-clutch mechanism in this state, the locking member 60 is urged to the right in FIG. 8, thereby causing the disengagement between the second series of teeth 43 and locking pawl 62.

Even at this time, the first series of teeth 44 and click pawl 51 remain engaged with each other, and the click pawl 51 continues to urge the counter display member 40 upwardly as shown in FIG. 10. Thus, the pad member 49 is pressed against upper jacket shell 22 and prevents undesired movements of the counter display member 40.

When the magnetic disc cartridge 20 is reinserted into the camera, the blocking member 70 is moved again in its active position in the direction of arrow D as shown in FIG. 8. At this time, the locking member 60 is moved towards the counter display member 40 by the oblique edge 74 of the frontal wedge 73 of the blocking member 70. As a result, the locking pawl 62 is brought into engagement with the second series of teeth 43 of the counter display member 40 and locks again completely the counter display member 40 against rotation.

Thus the locking pawl 62 and second series of teeth 43 are reliably engaged with each other and lock the counter display member 40 against any rotation irrespective of an application of any external force on the counter display member 40.

As the second series of teeth 43 for locking completely the counter display member 40 against any rotation, and the first series of teeth 44 for the click stop action are provided respectively on the periphery and one side of the flange-like portion 42 forming an integral part of the counter display member 40, it is possible to simplify the machining thereof and to obtain increased mechanical strength compared with the case where the teeth for locking and the teeth for click stop action are provided only on the cylindrical periphery or only on one side of the flange-like portion 42.

In the embodiment of the invention, the locking pawl 62 is disengaged from the second series of teeth 43 of the counter display member 40, by rotation of the latter when the blocking member 70 is in its rearward inactive position and allows the disengagement of the locking pawl 62 consecutively to a radially outwards directed force caused by the sliding of the side of one tooth of the second series of teeth 43 over the locking pawl 62. Thus, there is no need of providing any particular spring or like means for biasing the locking member 60 for removing it from its locking position. This may be considered as an additional advantage as the counter display member 40 can only be rotated after the insertion of the drive pin 25 and its driving catch 26 into the central bore 45 and the pointer notch 46 of said counter display member 40. In this way, the counter display member 40 is associated with a locking structure which is very simple and easy to be assembled.

As means for slidably mounting the blocking member 70 in the lower jacket shell 21, it has been proposed to caulk the ends of the centering pins 33 and 34. With such means, however, ready detachment of the blocking member 70 due to vibration is possible if the caulking is insufficient. Also, excessive caulking would prevent smooth movement of the blocking member 70. Furthermore, the caulking process itself requires extra staff and equipment, which is undesired from the standpoint of simplification of the fabrication process and cost reduction.

Thanks to the detachment prevention means of this embodiment, the blocking member 70 is mounted slidably set in the lower jacket shell 21 without any possibility of inadvertent detachment of said blocking member 70.

In the above embodiment, the locking member 60 is provided with only a single locking pawl 62. However, it is possible to provide a plurality of locking pawls. In an example shown in FIGS. 11A and 11B, locking member 90 is provided with three locking pawls 91, 92 and 93.

EFFECTIVENESS OF THE INVENTION

As it has been shown by the foregoing description, the present invention proposes a first series of teeth 44 for a resilient click stop action, and a second series of teeth 43 for a locking action, said first and second series of teeth being provided respectively on one side of a flange-like portion 42 integral with a counter display member 40 and on the outer periphery of the latter. The counter display member is mounted in a disc cartridge 20 and cooperates with a locking pawl 62 of a locking member 60 and a click pawl 51 of a click member 50, so that any inadvertent rotation of the counter display member is prevented with accuracy.

In addition, the blocking member 70 is slidably mounted in a jacket shell where an undercut portion in one side wall of said jacket shell fits with one lateral edge of the blocking member, thereby ensuring a smooth movement of the blocking member. In addition, it is possible to prevent occasional detachment of the blocking member 70 due to vibrations appearing during the assembling of the two jacket shells of the disc cartridge, thereby providing improved operation efficiency in assembling.

In the above embodiment, the first series of teeth 44 is formed on the lower side of the flange-like portion 42. However, it is also possible to provide the first series of teeth on the upper side of the flange-like portion 42. In this case, the click pawl 51 of the click member 50 engaging with the first series of teeth is placed above the flange-like portion 42 and its click stop action is directed towards the bottom of the lower jacket shell 21. In this case, the pad member 49 is bound to the lower side of the flange-like portion 42.

What is claimed is:

1. A magnetic disc cartridge comprising a jacket; a magnetic flexible disc rotatably accommodated in said jacket; a window cut in said jacket and permitting the insertion of a magnetic head of an apparatus for recording and reproducing signals on the disc; a counter display member rotatably mounted in said jacket and being co-axially surrounded on the upper side of the jacket by a graduated display scale, said counter display member having a keyhole-like aperture forming a radially orientated pointer cooperating with said display scale; and elastically and permanently acting click and pawl arrangement including a first series of teeth formed on a section of a flange-like portion of said counter display member and a click fixed to said jacket and elastically engaging the teeth of said first series of teeth; a second series of teeth on an adjacent section of said flange-like portion; and a blocking device which engages said second series of teeth and thereby keeps the counter display member in a firmly locked position as soon as the cartridge is mechanically disconnected from said apparatus having the magnetic head.

2. A magnetic disc cartridge in which a magnetic disc and a cylindrical counter display member for displaying the number of recorded tracks on the magnetic disc are rotatably accommodated in a cartridge body, said cartridge comprising:

a flange-like portion provided at an axially predetermined portion of said counter display member;

a first series of teeth and a second series of teeth formed respectively on one side of said flange-like portion and on the outer periphery thereof at a pitch corresponding to a unitary rotational angle of said counter display member; and, within said cartridge body, a device for controlling rotation of said counter display member including a locking member engaging with at least a pair of the teeth of said second series of teeth formed on said outer periphery, a blocking member operative for securely holding said locking member in engagement with said second series of teeth of said outer periphery and a click member elastically engaging with at least a pair of the teeth of said first series of teeth formed on one side of said flange-like portion.

3. A magnetic disk cartridge according to claim 2; wherein said block member is movable in predetermined directions by operating means from the outside of the cartridge body and has a frontal wedge with an oblique edge, said locking member has a raised portion provided with an oblique edge which is adapted for engagement with said oblique edge of said frontal wedge so that said locking member is thereby moved in directions substantially perpendicular to said directions of movement of said blocking member for urging said locking member into engagement with at least a pair of said teeth of said second series of teeth.

4. A magnetic disc cartridge according to claim 2, wherein said click member includes a body and a click pawl connected to said body of the clock member by elastic arm portions, said clock pawl engaging elastically with teeth of said first series of teeth.

5. A magnetic disc cartridge according to claim 4; wherein said cartridge body includes upper and lower shells forming a jacket, and said lower shell has stoppers extending therefrom and by which said click pawl is prevented from being moved with said counter display member.

6. A magnetic disc cartridge according to claim 4; wherein said click pawl has a tip with angled faces including an angle bigger than an inter-tooth angle between two adjoining teeth of said first series of teeth.

7. A magnetic disc cartridge according to claim 3; wherein said cartridge body includes upper and lower jacket shells, undercut portions are defined by a protuberance provided on an inner wall surface of one lateral side of said lower jacket shell, and said blocking member is slidably retained in said undercut portions.

8. A magnetic disc cartridge according to claim 3; wherein said block member is spring biased by a coil spring in one of said directions by which said locking member is urged into engagement with a pair of teeth of said second series of teeth.

* * * * *